United States Patent [19]
Cockerill

[11] Patent Number: 5,822,976
[45] Date of Patent: Oct. 20, 1998

[54] METHOD AND SYSTEM FOR CONTROLLING THE AMOUNT OF SECONDARY AIR INTRODUCED INTO AN INTERNAL COMBUSTION ENGINE

[75] Inventor: Charles Allen Cockerill, Brighton, Mich.

[73] Assignee: Ford Global Technologies, Inc., Dearborn, Mich.

[21] Appl. No.: 417,351

[22] Filed: Apr. 5, 1995

[51] Int. Cl.$^6$ ....................................................... F01N 3/20
[52] U.S. Cl. ............................ 60/274; 60/276; 60/285; 60/289; 60/290
[58] Field of Search ............................ 60/274, 287, 289, 60/290, 307, 276, 285

[56] References Cited

U.S. PATENT DOCUMENTS

| | | | |
|---|---|---|---|
| 3,832,848 | 9/1974 | Scholl | 60/276 |
| 3,961,477 | 6/1976 | Grieshaber et al. | 60/290 |
| 3,986,352 | 10/1976 | Casey | 60/276 |
| 4,110,979 | 9/1978 | Miyagi et al. | 60/276 |
| 4,112,678 | 9/1978 | Miyagi | 60/276 |
| 4,231,220 | 11/1980 | Takeda | 60/289 |
| 4,271,667 | 6/1981 | Mitsuda et al. | 60/276 |
| 4,363,209 | 12/1982 | Atago | 60/276 |
| 4,363,210 | 12/1982 | Kawai | 60/276 |
| 4,385,491 | 5/1983 | Sakurai | 60/276 |
| 5,113,651 | 5/1992 | Kotzan et al. | 60/274 |
| 5,152,137 | 10/1992 | Nishizawa | 60/276 |
| 5,285,639 | 2/1994 | Araki et al. | 60/289 |
| 5,381,658 | 1/1995 | Meguro | 60/276 |
| 5,490,381 | 2/1996 | Becker | 60/276 |

FOREIGN PATENT DOCUMENTS 5314222 of 1978 Japan .
5425324 of 1979 Japan .

*Primary Examiner*—Douglas Hart
*Attorney, Agent, or Firm*—Donald A. Wilkinson; Roger L. May

[57] ABSTRACT

A method and system for controlling the amount of secondary air introduced into a vehicle's exhaust gases in order to maintain a desired catalyst air/fuel ratio for a predetermined engine air/fuel ratio. First, a quantity of primary air flow necessary to maintain the predetermined engine air/fuel ratio is determined. Next, a quantity of secondary air flow necessary to maintain the desired catalyst air/fuel ratio is determined. Finally, a controller controls the amount of secondary air introduced into the vehicle's exhaust gases based on the determined quantity of secondary air flow.

10 Claims, 3 Drawing Sheets

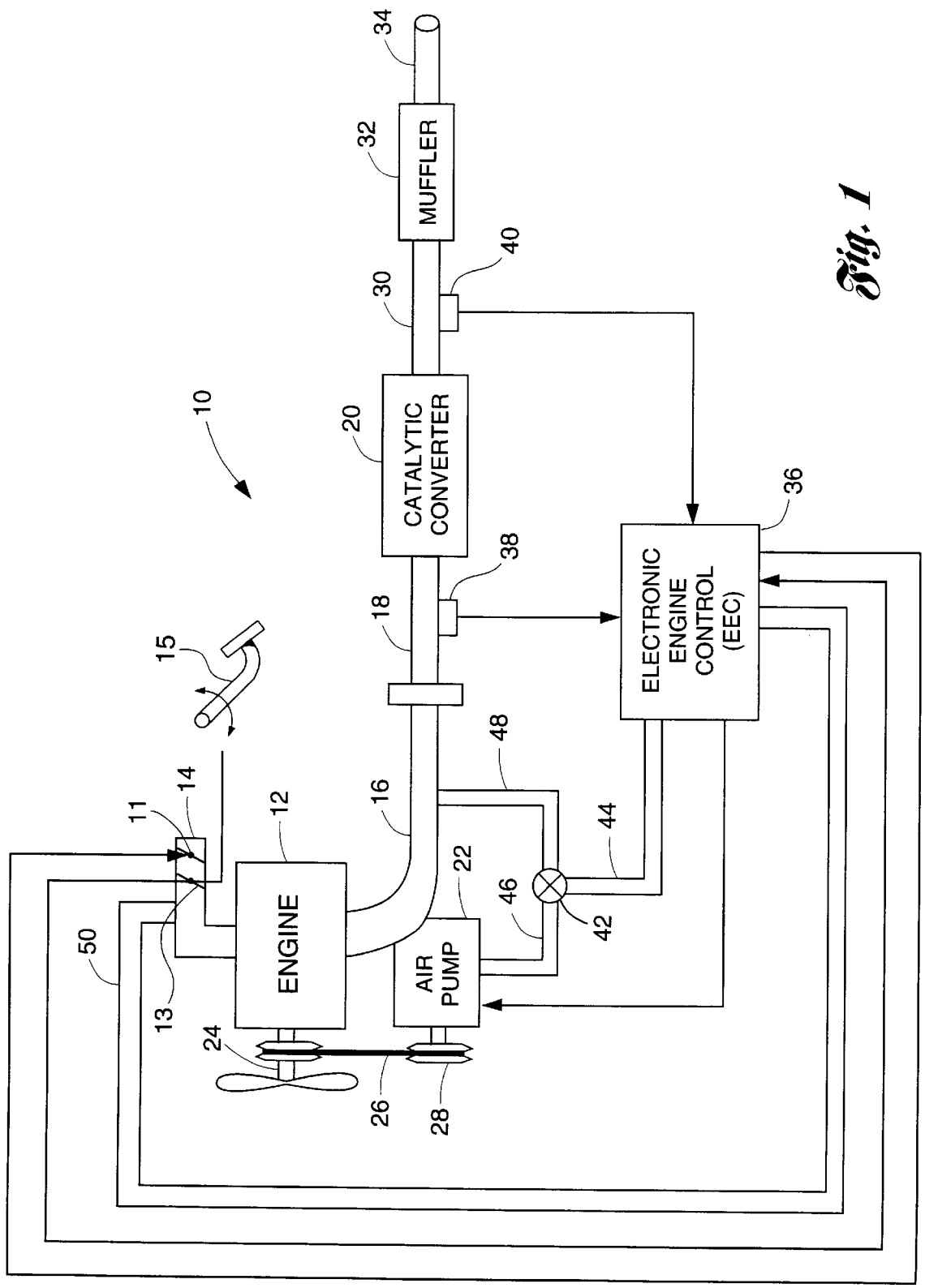

METHOD AND SYSTEM FOR CONTROLLING THE AMOUNT OF SECONDARY AIR INTRODUCED INTO AN INTERNAL COMBUSTION ENGINE

TECHNICAL FIELD

This invention relates to a method and system for controlling the amount of secondary air introduced into an internal combustion engine in order to maintain a desired exhaust air/fuel ratio for any given engine air/fuel ratio.

BACKGROUND ART

An internal combustion engine emits exhaust gas consisting of products from the combustion of the air/fuel mixture added to the engine. Fuel is a mixture of chemical compounds, termed "hydrocarbons" (HC). The various fuel compounds are a combination of hydrogen and carbon. Under perfect combustion conditions, the hydrocarbons would combine in a thermal reaction with the oxygen in the air to form carbon dioxide ($CO_2$) and water ($H_2O$). Unfortunately, perfect combustion does not occur and in addition to $CO_2$ and $H_2$), carbon monoxide (CO), oxides of nitrogen ($NO_x$), and hydrocarbons (HC) occur in the exhaust gas as a result of the combustion reaction. Additives and impurities in the fuel also contribute minute quantities of compounds such as lead oxides, lead halogenides, and sulfur oxides. Therefore, federal statutes have been enacted to regulate the allowable amount of HC, $NO_x$, and CO emitted from a vehicle's engine.

The greatest effects on the combustion process, and therefore on the exhaust emissions, is the mass ratio of air to fuel. The air/fuel ratio must lie within a certain range for optimal ignition and combustion. For an internal combustion engine, the mass ratio for complete fuel combustion is approximately 14.7:1; i.e., 14.7 kilograms of air to 1 kilogram of fuel. This ratio is known as the stoichiometric ratio. In terms of volume, approximately 10,000 liters of air is required for 1 liter of fuel.

When the fuel mixture contains excessive fuel, or is running rich, CO emissions increase almost linearly with the increasing amount of fuel. However, when the fuel mixture contains excessive oxygen, or is running lean, CO emissions are at their lowest. As with CO emissions, HC emissions increase with an increasing amount of fuel. At very lean air/fuel ratios, the HC emissions increase again due to less than optimal combustion conditions resulting in unburned fuel.

The effect of the air/fuel ratio on $NO_x$ emissions is the opposite of HC and CO on the rich side of stoichiometry. As the air content increases, the oxygen content increases and the result is more $NO_x$. On the lean side of stoichiometry, $NO_x$ emissions decrease with increasing air because the decreasing density lowers the combustion chamber temperature.

To reduce the exhaust gas emission concentration, a catalytic converter is typically installed in the exhaust system of an internal combustion engine. Chemical reactions occur in the converter that transform the exhaust emissions to less harmful chemical compounds. The most commonly used converter for an internal combustion engine is the three-way converter (TWC). As the name implies, it simultaneously reduces the concentration of all three regulated exhaust gases: HC, CO, and $NO_x$. The catalyst promotes reactions that oxidize HC and CO, converting them into $CO_2$ and $H_2O$, while reducing $NO_x$ emissions into $N_2$. In order for the catalytic converter to operate at the highest efficiency for conversion for all three gases, the average air/fuel ratio must be maintained within less than 1% of stoichiometry.

Typically, automobile manufacturers utilize an exhaust gas oxygen sensor in the electronic engine control system to maintain stoichiometric air/fuel ratio. This sensor is installed in the exhaust system upstream of the catalytic converter and responds to the oxygen content in the exhaust gas. The oxygen content is a measure of the excess air (or a deficiency of air) in the exhaust gas.

Automobile manufacturers also utilize a secondary air pump to reduce the emission of CO and HC. The secondary air pump is driven by a crankshaft of the engine via a belt and a pulley having a predetermined size. The size of the pulley is driven by federal statutes. That is, the size of the pulley is determined based on the optimum emissions regulated by federal statutes.

Currently, the secondary air pump runs in two modes only, ON or OFF. Consequently, the secondary air pump controls the treated exhaust gas air/fuel ratio by adjusting the engine air/fuel ratio to meet the needs of the air pump. If the air pump has too much air flow, then the engine must run rich and thus the temperature of the catalyst rises due to excess CO. If, on the other hand, the air pump has too little air flow, then the engine must run lean and possibly burn the engine or catalyst due to high exhaust temperatures.

DISCLOSURE OF THE INVENTION

It is thus a general object of the present invention to provide a method and system for controlling the amount of secondary air introduced into an internal combustion engine in order to maintain a desired catalyst air/fuel ratio for a predetermined engine air/fuel ratio.

In carrying out the above objects and other objects, features and advantages of the present invention, a method is provided for determining the oxygen content of the exhaust gases and controlling the amount of secondary air injected into the exhaust gases. The method includes the initial step of determining a quantity of primary air flow necessary to maintain the predetermined engine air/fuel ratio based on the oxygen content of the exhaust gases. The method also includes the step of determining a quantity of secondary air flow necessary to maintain the desired catalyst air/fuel ratio based on the determined quantity of primary air flow. Finally, the method concludes with the step of controlling the secondary air delivered by the air pump based on the determined quantity of secondary air flow required.

In further carrying out the above objects and other objects, features and advantages of the present invention, a system is also provided for carrying out the steps of the above-described method.

The above objects and other objects, features, and advantages of the present invention, as well as others, are readily apparent from the following detailed description of the best mode for carrying out the invention when taken in connection with the accompanying drawings.

BRIEF DESCRIPTION OF THE DRAWINGS

FIG. 1 is a block diagram of the preferred embodiment of the present invention;

BEST MODES FOR CARRYING OUT THE INVENTION

Figure 2A:
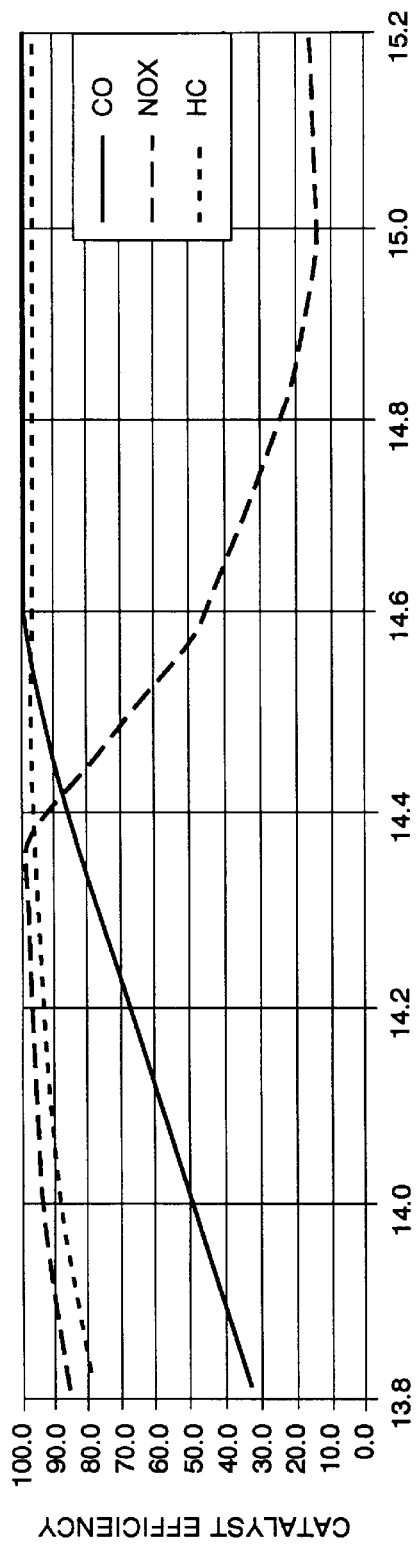
FIGS. 2A and 2B are graphs illustrating catalyst efficiency versus after catalyst air/fuel ratio for various predetermined engine air/fuel ratios.

Referring now to FIG. 1, a block diagram of the system of the present invention is shown, denoted generally by reference numeral 10. The system 10 includes an internal combustion engine 12 having an intake manifold 14 and an exhaust manifold 16.

Primary air is drawn into the intake manifold 14 and flows through a duct into an air flow valve 11. The air flow valve 11 is a hinged plate that opens and closes as necessary to maintain the correct quantity of primary air flowing into the engine 12. Primary air flow is monitored and maintained using a throttle valve 13, which will be described in greater detail below. The throttle valve 13 is controlled by an accelerator pedal 15 and generates a corresponding throttle valve position signal.

As the engine 12 burns a fuel mixture, the burnt air/fuel mixture is exhausted from the engine 12 into the exhaust manifold 16. From the exhaust manifold 16, the untreated exhaust gases flow through an exhaust pipe 18 into a catalytic converter 20.

The catalytic converter 20 treats the exhaust gases by converting the hydrocarbons (HC) and the carbon monoxide (CO) into water vapor and carbon dioxide, respectively utilizing extreme heat. However, the extreme heat reacts adversely with nitrogen in the exhaust gases. The result is the generation of the element nitric oxide ($NO_x$). However, the $NO_x$ is converted into harmless nitrogen using a catalyst, such as rhodium.

The treated exhaust gases—water vapor, carbon dioxide, and nitrogen—are expelled from the catalytic converter 20 through a rear exhaust pipe 30, muffler 32 and tailpipe 34.

The system 10 also includes an air pump 22 for adding secondary air to the untreated exhaust gas in the exhaust manifold 16 to reduce the emissions of CO and HC. The air pump 22 is clutch-driven using a crankshaft 24 of the engine 12, a belt 26 and a pulley 28.

The system 10 further includes an Electronic Engine Control (EEC) 36. The EEC 36 functions to maintain the proper mixture of air and fuel needed for the car's driving conditions. The EEC 36 is coupled to the air pump 22 for cycling the air pump 22 ON and OFF.

Also coupled to the EEC 36 are a first oxygen sensor 38 and a second oxygen sensor 40 for generating a first and second oxygen feedback signal to the EEC 36, respectively. The first oxygen sensor 38 is located upstream of the catalytic converter 20 and senses the untreated exhaust gas in the exhaust pipe 18. The second oxygen sensor 40 is located downstream of the catalytic converter 20 and senses the treated exhaust gas in the rear exhaust pipe 30. The first and second oxygen sensors 38, 40 are typical Heated Exhaust Gas Oxygen (HEGO) sensors known by those having ordinary skill in the art. If the first and second oxygen sensors 38, 40 generate an oxygen feedback signal indicating there is minimum oxygen in the exhaust gas, the fuel mixture being provided to the engine 12 is rich. Conversely, if the oxygen feedback signal indicates there is excessive oxygen in the exhaust gas, the fuel mixture being provided to the engine 12 is lean.

An air control valve 42 is also coupled to the EEC 36 via a vacuum conduit 44. The air control valve 42 is a vacuum controlled valve utilized to control the amount of secondary air that is added by the air pump 22 to the exhaust manifold 16 via conduits 46, 48 for optimal emissions based on the feedback signals from the first and second oxygen sensors 38, 40. A conduit 50 coupled between the intake manifold 14 and the EEC 36 provides a vacuum source necessary to operate the air control valve 42.

An ideal stoichiometric fuel mixture of approximately 14.7 parts of air to 1 part of gasoline allows fuel to burn almost completely, thereby producing the least amount of exhaust gases which pollute the atmosphere. However, it may be desirable to run the engine 12 at an air/fuel ratio which is best for the engine based on performance and durability data while maintaining an optimized air/fuel ratio for the treated exhaust gas. For example, it may be desirable to run the engine 12 rich of stoichiometric air/fuel ratio, e.g., 13.5:1, which is optimum for the engine 12, yet maintain an optimum air/fuel ratio after the catalytic converter 20, e.g., 14.7:1. This is accomplished by diluting the untreated exhaust gases in the exhaust manifold 16 with secondary air from the air pump 22.

Figure 2B:
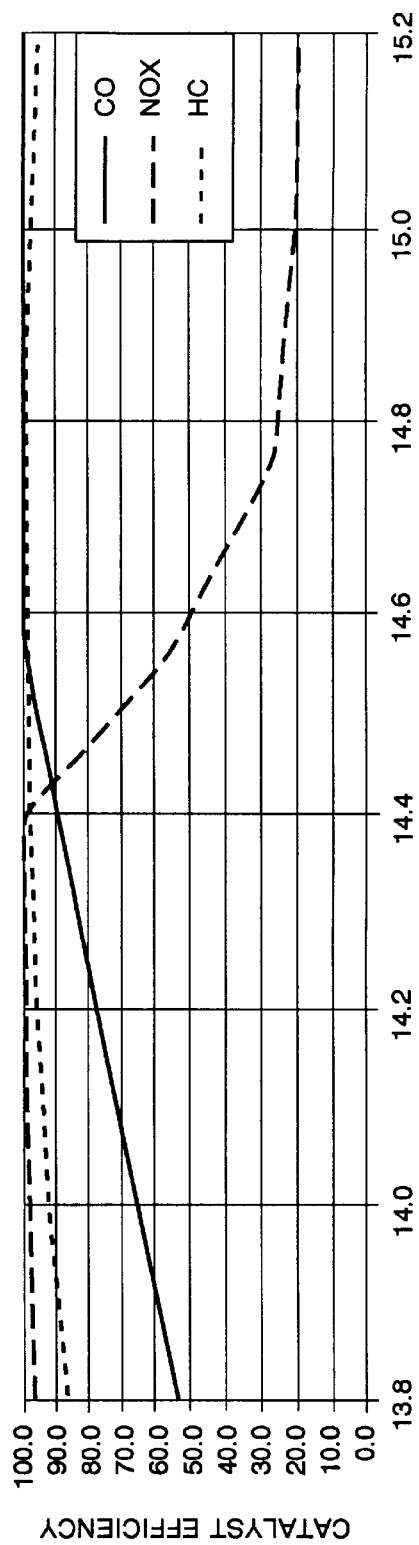

It may also be desirable to optimize the efficiency of the catalytic converter 20 for converting HC, $NO_x$ and CO into $CO_2$ and $H_2O$. A lean air/fuel ratio selected for the treated exhaust gas results in a low efficiency of the catalytic converter 20 since the emission of $NO_x$ in the treated exhaust gas is increased. Conversely, a rich air/fuel ratio results in a high efficiency of the catalytic converter 20 since the emission of CO and HC in the treated exhaust gas is at a minimum. FIGS. 2A and 2B illustrate the effect of exhaust air/fuel ratio on catalyst efficiency at a constant engine air/fuel ratio. The catalyst efficiency curves of FIG. 2A were run for an engine having an air/fuel ratio of 13.5:1, while the engine air/fuel ratio is 13.0:1 in FIG. 2B.

Figure 3:
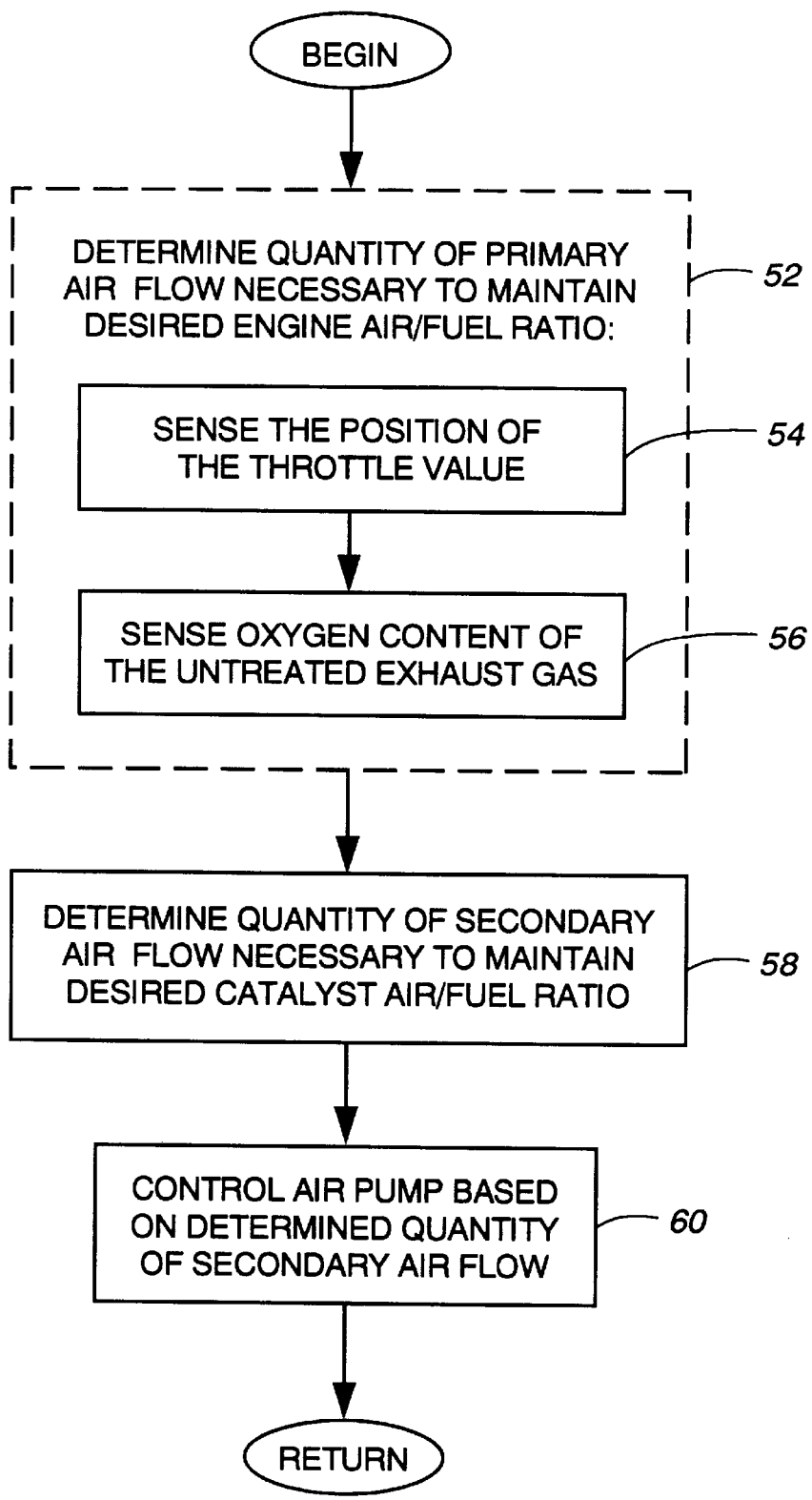
FIG. 3 is a flow diagram illustrating the general sequence of steps associated with the operation of the present invention.

A desired treated exhaust gas air/fuel ratio may be maintained for any given predetermined air/fuel ratio for the engine 12. Referring now to FIG. 3, there is shown a flow diagram illustrating the general sequence of steps associated with the operation of the present invention.

The method begins with the step of determining the amount of primary air flow required to maintain a predetermined engine air/fuel ratio, as shown by block 52. This step includes the steps of sensing the position of the throttle valve and sensing the oxygen content of the untreated exhaust gas, as shown by blocks 54 and 56, respectively. Based on the feedback signals generated by the throttle valve 13 and the first oxygen sensor 38, the EEC 36 directs the air flow valve 11 to open or close as necessary in order to pass as much or as little primary air as necessary to maintain the desired engine, or untreated exhaust gas, air/fuel ratio.

During periods when the throttle valve 13 is wide open (WOT), the engine 12 is running rich. The first oxygen sensor 38, therefore, does not sense any oxygen. Consequently, a conventional air flow meter (not shown), is utilized to maintain engine air/fuel ratio during WOT. However, the accuracy of the air flow meter varies. Therefore, an alternate strategy is employed during WOT. At WOT, a pulse width of the fuel injected into the engine 12 is known. The EEC 36, however, determines what the pulse width should be in order to maintain the engine air/fuel ratio. The newly determined pulse width is implemented for a predetermined amount of time. During the predetermined amount of time, the oxygen feedback signal from the first oxygen sensor 38 provides an indication as to whether the engine air/fuel ratio is running rich or lean. Based on the oxygen feedback signal, the pulse width during WOT is then corrected because an incorrect amount of air was sensed by the air flow meter. The correct amount of primary air being supplied to the engine 12 is now known to ensure the engine is running at the desired air/fuel ratio.

The method continues with the step of determining the quantity of secondary air flow necessary to maintain a desired catalyst air/fuel ratio, as shown by block 58. Knowing that the engine 12 is running at the desired engine air/fuel ratio, the system 10 can now determine the amount of secondary air flow required to deliver the desired air/fuel ratio in the exhaust stream. Fuel is supplied to the engine 12 based on the air sensed by the air flow meter and the desired engine air/fuel ratio. Knowing the fuel flow and the desired catalyst air/fuel ratio, a total amount of air flow can be determined.

For example, for a desired engine air/fuel ratio of 12.5:1 and an amount of primary air of 1400 lbs/hr, the fuel flow is determined as follows:

Fuel Flow=1400/12.5=112 lbs/hr fuel flow. For a catalyst air/fuel ratio of 14.4:1, then the total amount of air required is determined as follows:

112 lbs/hr×14.4=1612.8 lbs/hr air flow. The difference between the actual air flow and the desired air flow is accounted for by the air pump 22 as follows:

1612.8−1400=212.8 lbs/hr secondary air flow.

The EEC 36 then controls the amount of secondary air introduced by the air pump 22 based on the determined quantity of secondary air flow.

While the best modes for carrying out the invention have been described in detail, those familiar with the art to which this invention relates will recognize various alternative designs and embodiments for practicing the invention as defined by the following claims.

What is claimed is:

1. For use with vehicle having an internal combustion engine which emits exhaust gasses, an intake manifold for providing primary air flow, an air pump driven directly from the engine to provide a secondary air flow, and a catalytic converter for treating the exhaust gases, a method for controlling the quanity of secondary air provided by the air pump so as to maintain a desired catalyst air/fuel ratio independently of the driving condition of the vehicle, the method comprising:

sensing an oxygen content of the untreated exhaust gas and generating a corresponding oxygen content signal;

determining a quantity of primary air/flow necessary to obtain a desired air/fuel ratio for the engine based on the oxygen content signal;

controlling the primary air flow provided by the intake manifold based on the desired air/fuel ratio for the engine;

determining a quantity of secondary air flow necessary to maintain the desired catalyst air/fuel ratio based on the determined quantity of primary air/flow; and activating a control valve disposed between the air pump and the catalytic converter to control the quantity of secondary air provided by the air pump based on the determined quantity of secondary air.

2. The method of claim 1 wherein the vehicle further including an accelerator pedal and a throttle valve responsive to the accelerator pedal and wherein the step of determining the quantity of primary air flow further comprises sensing the position of the throttle valve.

3. The method of claim 1 wherein the step of determining the quantity of secondary air flow comprises:

determining a rate of fuel flow into the engine based on the determined quantity of primary air flow; and determining a desired total air flow based on the determined rate of fuel flow and the desired catalyst air/fuel ratio.

4. The method of claim 3 wherein the determined quantity of secondary air flow is the difference between the desired total air flow and the determined quantity of primary air flow.

5. For use with a vehicle having an internal combustion engine which emits exhaust gases, an intake manifold for providing primary air flow, an air pump driven directly from the engine to provide a secondary air flow, and a catalytic converter for treating the exhaust gases, a system for controlling the quantity of secondary air flow provided by the air pump so as to maintain a desired catalyst air/fuel ratio independently of the driving condition of the vehicle, the system comprising:

a sensor for sensing an oxygen content of the untreated exhaust gas and generates a corresponding oxygen content signal; and a controller for performing the following:

determining a quantity of primary air flow necessary to obtain a desired air/fuel ratio for the engine based on the oxygen content signal;

controlling the quantity of primary air flow product of the manifold based on the desired air/fuel ratio for the engine;

determining a quantity of secondary air flow necessary to maintain the desired catalyst air/fuel ratio based on the determined quantity of primary air flow;

generating an air control signal based on the determined quantity of secondary air flow; and activating an air control valve disposed intermediate the air pump and the catalytic converter to control the amount of secondary air supplied by the air pump in response to the air control signal.

6. The system of claim 5 wherein the vehicle further includes an accelerator pedal and a throttle valve responsive to the accelerator pedal and wherein the system further comprises:

a sensor coupled to the throttle valve for sensing the position of the throttle valve and generating a corresponding position signal for receipt by the controller.

7. The system of claim 6 wherein the controller is further provided for performing the following:

determining a rate of fuel flow into the engine based on the determined quantity of primary air flow; and determining a desired total air flow based on the determined rate of fuel flow and the desired catalyst air/fuel ratio.

8. The method as recited in claim 1 wherein the step of determining the quantity of primary air flow comprises:

determining a preliminary pulse width of fuel necessary to maintain the predetermined engine air/fuel ratio;

injecting fuel into the engine based on the preliminary pulse width; and sensing an oxygen content of the exhaust gases in response to the fuel being injected into the engine.

9. The system as recited in claim 5 wherein the system further includes:

the controller for determining a preliminary pulse width of fuel necessary to maintain the predetermined engine air/fuel ratio;

means, operatively coupled to the controller, for injecting fuel into the engine based on the preliminary pulse width; and a sensor disposed in the exhaust gases for sensing an oxygen content of the exhaust gases and generating a corresponding oxygen signal for receipt by the controller in response to the fuel being injected into the engine.

10. The system as recited in claim 5 wherein the air control valve is a vacuum controlled valve.

* * * * *